United States Patent
Lynn et al.

(10) Patent No.: US 11,933,399 B2
(45) Date of Patent: Mar. 19, 2024

(54) PULLEY GUARD TO PROTECT FROM DEBRIS

(71) Applicant: KUBOTA CORPORATION, Osaka (JP)

(72) Inventors: Jordan Lynn, Gainesville, GA (US); Dwight Dillashaw, Alto, GA (US)

(73) Assignee: KUBOTA CORPORATION, Osaka (JP)

( * ) Notice: Subject to any disclaimer, the term of this patent is extended or adjusted under 35 U.S.C. 154(b) by 308 days.

(21) Appl. No.: 17/137,599

(22) Filed: Dec. 30, 2020

(65) Prior Publication Data
US 2022/0205517 A1     Jun. 30, 2022

(51) Int. Cl.
*F16H 7/02*     (2006.01)
*F16H 57/00*    (2012.01)

(52) U.S. Cl.
CPC .............. *F16H 7/02* (2013.01); *F16H 57/00* (2013.01)

(58) Field of Classification Search
CPC .......... A01D 75/18; A01D 34/81; F16H 7/02; F16H 57/035; F16H 57/00
USPC ......................................................... 474/144
See application file for complete search history.

(56) References Cited

U.S. PATENT DOCUMENTS

| | | | | |
|---|---|---|---|---|
| 2,696,741 A | * | 12/1954 | Wilkin | F16H 7/0827 474/119 |
| 3,938,400 A | * | 2/1976 | Konyha | G05G 7/02 180/6.66 |
| 4,023,429 A | * | 5/1977 | Davies, III | F16H 7/0827 474/140 |
| 4,301,902 A | * | 11/1981 | Gatsos | B60W 10/10 474/1 |
| 4,366,880 A | * | 1/1983 | Miller | B62J 13/00 180/219 |
| 4,648,855 A | * | 3/1987 | Palloch | D05B 69/30 112/261 |
| 4,696,661 A | * | 9/1987 | Rehlander | F16H 7/0827 180/6.66 |
| 4,869,708 A | * | 9/1989 | Hoffmann | F01L 1/022 474/140 |
| 5,012,632 A | * | 5/1991 | Kuhn | A01D 34/76 474/84 |
| 5,134,901 A | * | 8/1992 | Grady | B01F 23/235 261/DIG. 26 |
| 6,199,354 B1 | * | 3/2001 | King | A01D 34/6812 56/11.4 |
| 7,849,948 B2 | * | 12/2010 | Clarkson | B62J 15/00 280/852 |
| 8,182,380 B2 | * | 5/2012 | Kohigashi | F16H 7/0827 474/58 |

(Continued)

*Primary Examiner* — Henry Y Liu
(74) *Attorney, Agent, or Firm* — Greenblum & Bernstein, P.L.C.

(57) ABSTRACT

A pulley guard to protect a pulley from debris. Such pulley guard can be positioned proximate a driven pulley of a belt-pulley system. Such belt-pulley system can be part of a working vehicle, such as a mower or other self-propelled vehicle, which includes an endless belt. A pulley to be protected against debris can be an output pulley of a power source that is used to drive mower blade(s) and/or drive wheels of the vehicle. One or more pulleys to be protected against debris can include any pulley of the belt-pulley system of a vehicle, such as a belt tensioning or idler pulley.

4 Claims, 10 Drawing Sheets

(56) References Cited

U.S. PATENT DOCUMENTS

| | | | | |
|---|---|---|---|---|
| 8,425,356 | B2* | 4/2013 | Vachal | F16H 7/18 |
| | | | | 474/131 |
| 8,561,750 | B2* | 10/2013 | Kakimoto | B62M 9/16 |
| | | | | 474/140 |
| 8,567,166 | B2* | 10/2013 | Minoura | A01D 69/06 |
| | | | | 56/11.6 |
| 2006/0046883 | A1* | 3/2006 | Nishimoto | B62J 13/02 |
| | | | | 474/144 |
| 2007/0039302 | A1* | 2/2007 | Velke | A01D 69/03 |
| | | | | 56/11.9 |
| 2008/0295478 | A1* | 12/2008 | Majkrzak | A01D 34/38 |
| | | | | 56/229 |
| 2011/0251003 | A1* | 10/2011 | Nishimiya | F16H 7/02 |
| | | | | 474/144 |
| 2016/0029557 | A1* | 2/2016 | Baker | A01D 34/6806 |
| | | | | 56/11.7 |
| 2016/0037718 | A1* | 2/2016 | Reid, Sr. | A01D 34/81 |
| | | | | 56/17.4 |

* cited by examiner

PULLEY GUARD TO PROTECT FROM DEBRIS

BACKGROUND

1. Field

The present disclosure relates to a guard to protect a pulley from the ingress of debris. More particularly, and in any of a plurality of embodiments, the present disclosure relates to a pulley having a grooved rim, for use with a belt that is engaged within the rim and is configured to exert a pulling force to change the direction in which the belt runs.

More particularly, a guard of the present disclosure relates to protecting against the ingress of debris during the use of the pulley as the pulling force turns the pulley. The pulling force can be generated by a motor or prime mover, such as an engine or a battery, or otherwise. With more particularity, the present disclosure relates to a plurality of pulleys that are embodied in a belt-pulley system of a working vehicle, such as a mower or other self-propelled vehicle, which includes an endless belt. A pulley to be protected against debris can be an output pulley of a power source that is used to drive mower blade(s) and/or drive wheels of the vehicle. One or more additional pulleys to be protected against debris can include any pulley of a belt-pulley system of a vehicle, such as a belt tensioning or idler pulley.

2. Description of Related Art

For context of an example of a self-propelled working vehicle to which the present disclosure can be embodied, reference is made to U.S. Pat. No. 8,567,166 (US '166), the disclosure of which is hereby incorporated by reference thereto in its entirety.

With reference to FIGS. 1-4 of US '166, the vehicle includes an engine provided in a rear portion of the vehicle body and a left-right pair of rear wheel drive apparatuses in which an input shaft is coupled by a drive transmission belt to an output shaft of the engine. FIGS. 3 and 4 illustrate a belt and pulley system of the vehicle for a hydrostatic transmission (HST) and another belt and pulley system for driving a plurality of cutting blades.

The left-right pair of rear wheel drive apparatuses of US '166 include a hydrostatic transmission coupling the rear wheel to the input shaft. The drive force of the input shaft is modified by the hydrostatic transmission into forward drive power and reverse drive power. The speed of the forward drive power and the reverse drive power is then steplessly shifted and transferred to the rear wheel. The self-propelled vehicle includes a left-right pair of control levers provided in the driving portion and respectively coupled to operation portions of a left-right pair of hydrostatic transmissions. The left-right pair of control levers is oscillated and when the left-right pair of rear wheels is driven at the same drive speed in a forward direction and a rear direction by the left-right pair of hydrostatic transmissions, the self-propelled vehicle drives straight forward and straight backward. When the left-right pair of rear wheels is driven by the left-right pair of hydrostatic transmissions in different directions or in the same direction but at different drive speeds, the self-propelled vehicle drives in a circle.

It has been recognized that during use of a vehicle of the US '166 type a transmission belt is susceptible to having debris ejected rearwardly from the forwardly positioned mower deck and become pinched between a belt and a pulley. This can cause the belt to become dislodged from the pulley and/or to become damaged. Such debris can be in various forms, such as acorns, pine cones, sweetgum balls, wood chips, twigs, and various other types of debris that can cover the terrain that is being mowed or otherwise worked or traveled over. Further, when working on uneven terrain, such as mowing between trees, for example, the terrain can have many irregularities. Such terrain can cause the orientation of a mowing deck to change in relation to the rear portion of the vehicle, causing the belt to become dislodged, particularly if debris has become pinched between the belt and a pulley.

Attempts have been made to decrease the occurrence of debris being ejected from the mower deck and dislodging and damaging the belt.

One such attempt with regard to a forwardly positioned mower deck, such as with a zero-turn mower, has been a guard positioned at the rear edge of the mower deck so as to reduce the likelihood of debris being ejected from the mower deck.

Another attempt has included a guard positioned proximate the aforementioned guard at the rear edge of the mower deck, in the form of an elongated pin that extends upwardly in front of a mower deck pulley.

SUMMARY

In view of the foregoing, the present disclosure is directed to a pulley guard that reduces the chance of debris entering a pulley.

In addition to the pulley guard itself, the present disclosure describes the pulley guard as an aspect of belt-pulley system that includes a plurality of pulleys in engagement with the belt and spaced apart along the belt to define a driven path of the belt. Each of the pulleys is configured to receive a run-in section of the belt and to guide the belt to an out-going section of the belt, the run-in section and the out-going sections of the belt being spaced apart by a widthwise distance.

At least one of the plurality of pulleys includes a pulley guard for at least one of the pulleys, the pulley guard being positioned widthwise between the run-in and out-going sections of the belt.

According to embodiments, the pulley guard has a width defined by a first side edge proximate the run-in section of the belt and a second side edge proximate the out-going section of the belt; a portion between the first and side edges being non-planar; and a height defined by a top edge and bottom edge and configured to be equal to or greater than a height of the pulley.

According to embodiments, the pulley guard has a V-shape between the first and second side edges.

According to embodiments, the pulley guard has an arcuate shape between the first and second side edges.

According to embodiments, the pulley of the plurality of pulleys is specifically a prime mover output pulley that is configured to drive a belt-pulley to drive a hydrostatic transmission (HST) or blades of a power mower.

According to specific embodiments, the pulley guard can be one of a pin-guard or a plate guard.

According to an aspect of various embodiments, the pulley guard extends widthwise entirely between the run-in and out-going sections of the belt, thereby engaging the belt without a clearance between the belt and the pulley guard, or to extend widthwise between the run-in and out-going sections of the belt to position the guards as close as possible, thereby creating clearances between the guard and the belt sections, yet sufficiently close without the risk of touching either belt section so as to prevent debris from entering the pulley. In the first case, the side edges of the pulley guard include flexible side edge attachments that would not damage or interfere with the operation of the belt. In either case, though, the pulley can be said to be proximate the belt, the term "proximate" embracing both.

In embodiments, the pulley guard has a height that extends at least from or higher than a top of the pulley to below a bottom of the pulley.

In embodiments, the pulley guard extends under the pulley.

In embodiments, the pulley having a pulley guard is a power-driven pulley or two pulleys having respective pulley guards further including a belt tension pulley.

In embodiments, the pulley guard is made of sheet metal or plastic.

In embodiments, the pulley guard has curved side edge bends facing respective ones of the belt, so that should the pulley guard contact the belt, the belt would not be damaged.

In addition to the one or more pulley guards being part of a belt-pulley, such pulley guards can be part of a self-propelled working vehicle, such as a lawn-mowing or other working vehicle.

BRIEF DESCRIPTION OF THE DRAWINGS

The present disclosure is further described in the detailed description which follows, with reference to the following plurality of drawing figures by way of non-limiting examples of exemplary embodiments, in which like reference numerals represent similar parts throughout the several views of the drawings, and wherein.

DETAILED DESCRIPTION OF THE DISCLOSURE

The particulars shown herein are by way of example and for purposes of illustrative discussion of described exemplary embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. For example, although the term "belt" is used for convenience of this description, the term "belt" is intended to encompass a band of flexible material of any of differently shaped cross section, the latter including trapezoidal, rectangular, arc-shape, such as a circular arc-shape, for example.

Figure 1:
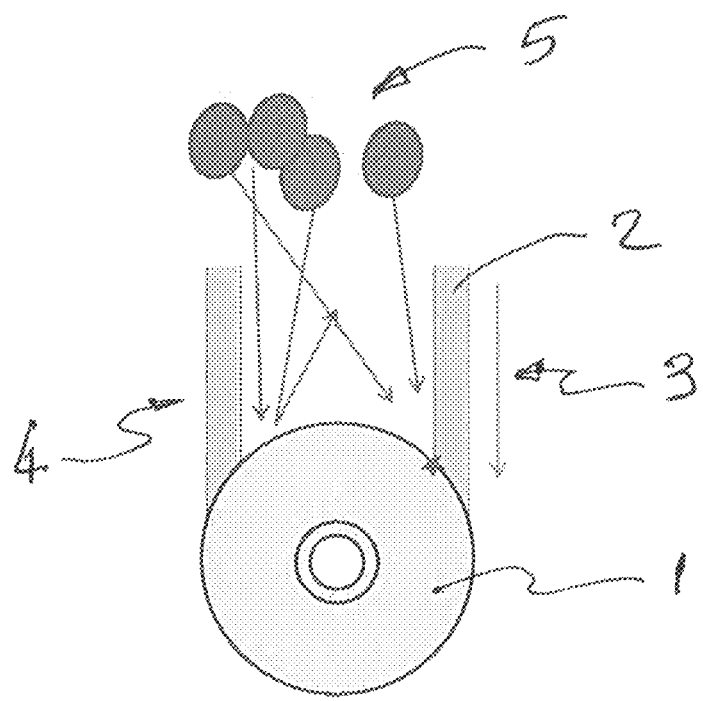
FIG. 1 is a schematic illustration of where debris can become pinched between a belt and a pulley without a pulley guard.

FIG. 1 schematically shows a pulley 1 around a portion of which a belt 2 is driven by a prime mover, such as an engine. The arrow 3 depicts a run-in section of the driven belt 2, an outgoing section 4 of the belt exiting the pulley 1. Assuming FIG. 1 being part of a belt-pulley system of a work vehicle, such as a mower, which has no pulley guard, as the run-in section 3 of the belt meets the pulley 1, the pulley is susceptible to debris 5 becoming pinched between the belt and pulley, where indicated by the star in FIG. 1. As a consequence, the belt 2 can become damaged and/or dislodged from the pulley 1.

Figure 2:
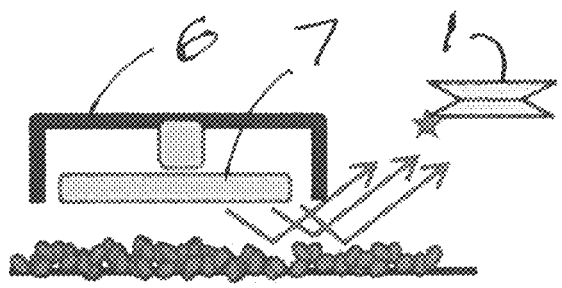
FIG. 2 is a schematic illustration of the problem shown in FIG. 1 in the context of a mower deck of a work vehicle.

FIG. 2 schematically shows the problem represented in FIG. 1 in the situation of a mower deck 6 having one or more driven blades 7, which can eject debris from beneath the deck 6 toward a rear portion of a work vehicle of which it is a part, and engage the pulley 1 where indicated by the star in FIG. 2.

Figure 3:
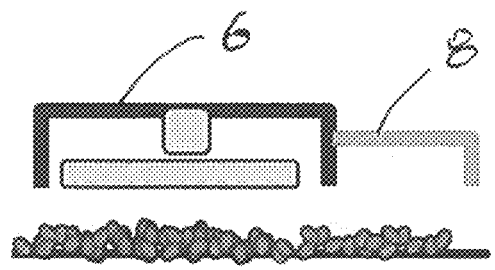
FIG. 3 is a schematic illustration of the mower deck of FIG. 2 having a debris guard added to the rear edge of the mower deck, the mower deck being on flat terrain.
Figure 4:
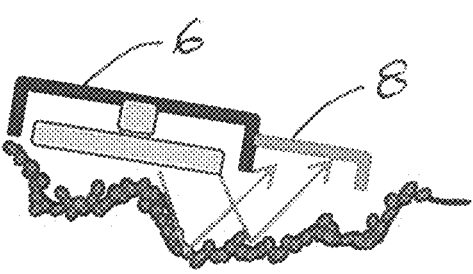
FIG. 4 is a schematic illustration like that of FIG. 3, with the mower deck being on uneven terrain.

As a countermeasure to what is shown in FIG. 2, it has been known to add a debris guard 8 in the form of a flange at the rear edge of the mower deck 6, as schematically shown in FIGS. 3 and 4. Whereas FIG. 3 illustrates the mower deck 6 being oriented along a flat terrain, FIG. 4 illustrates the mower deck traversing uneven terrain, the latter orientation of the mower deck still blocking debris. However, FIG. 5 schematically represents the situation by which, as the orientation of the mower deck 6 varies as the work vehicle travels along the terrain, debris can still be rearwardly ejected.

Figure 5:
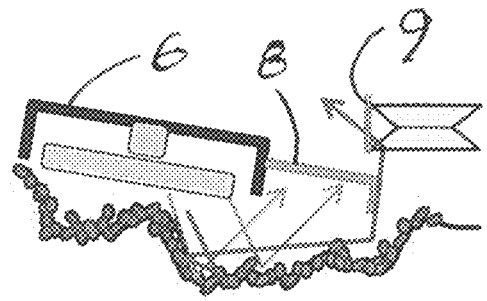
FIG. 5 is a schematic illustration like that of FIGS. 3 and 4, with the addition of an elongated pulley guard.

To provide an additional measure of protection against damage and/or dislodgement of the belt, an elongated guard has been known to be placed as shown in FIG. 5, namely, in the area of the mower deck 6, forward of the pulley 1.

The guards discussed above are located at the area of the mower deck, whereas the present disclosure provides for locating guards in a rear portion of a work vehicle, such as at an output pulley, that is, a prime mover or engine output pulley, or a tension pulley or an idler pulley as well.

Figure 6:
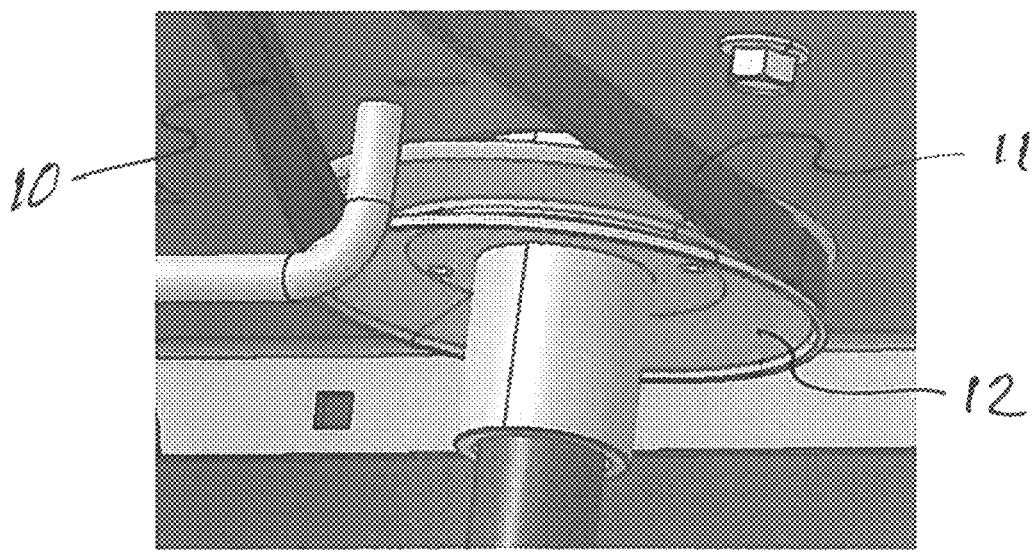
FIG. 6 illustrates a pulley guard in the form of a pin positioned laterally between run-in and outgoing sections of the belt of a belt-pulley system.

In this regard, FIG. 6 illustrates an example of embodiments in which a pulley guard 10 takes the form of a pin that is positioned laterally between a run-in section of the belt 11, that is, a section in which the belt is driven toward the pulley 12, and an out-going section of the belt, that is, a section in which is driven away from the pulley.

Figure 7:
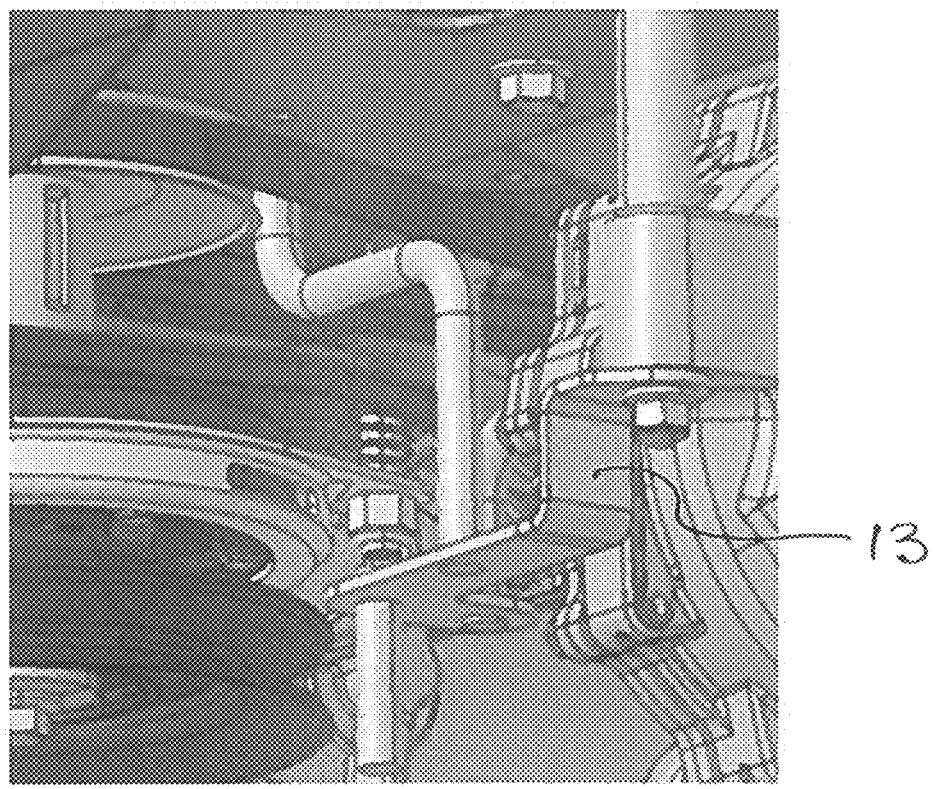
FIG. 7 is another view of FIG. 6, depicting a cantilever type structure for fixing the guard in relation to a working vehicle.

FIG. 7 illustrates another view of the embodiment of FIG. 6, showing a cantilever type structure 13 for fixing the pin guard 10 in relation to the working vehicle.

The pulley guard 10 is referred to as a "pin" guard for convenience, but the expression is intended to encompass any such guard that is elongated at least elongated between the opposing sections of the belt between it extends. The pin guard can have a circular cross section as well as other cross sections, such as multilateral, for example. The width/diameter of a pin guard can be 11.1 mm or approximately so, although other widths/diameters are also embraced within the scope of this disclosure.

Figure 21:
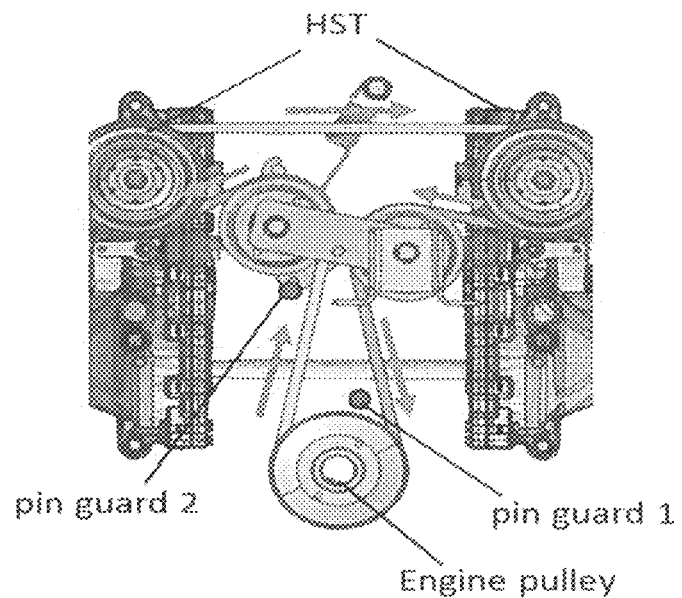
FIG. 21 is a plan view of part of a rear portion of a vehicle in which two pin guards are shown for a hydrostatic transmission belt and pulleys driven by an engine pulley.
Figure 22:
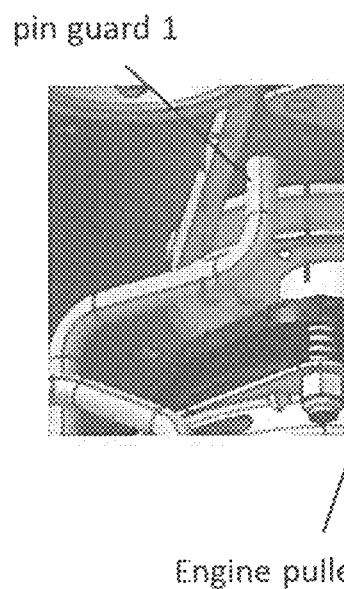
FIG. 22 is a perspective view of a first pin guard of FIG. 21, protecting the engine pulley against debris.
Figure 23:
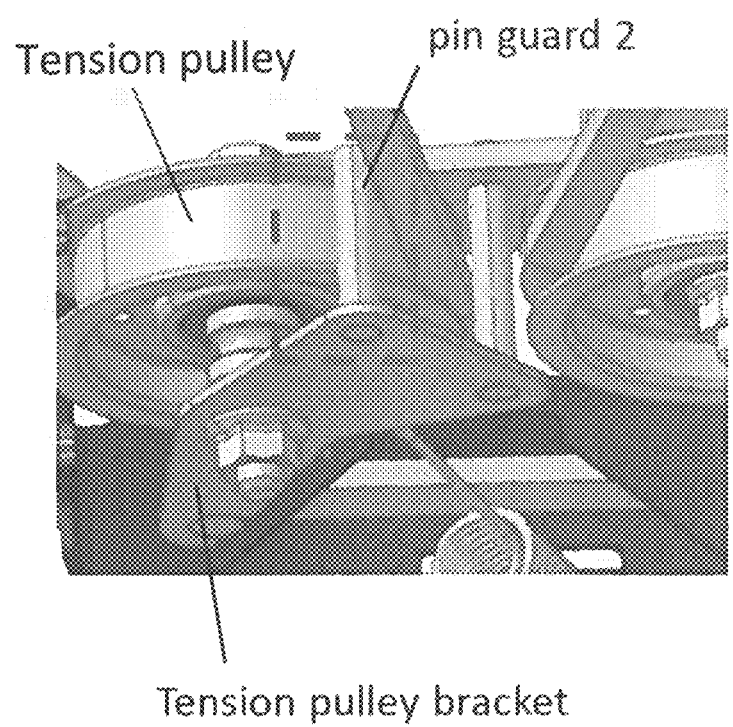
FIG. 23 is a perspective view of a second pin guard of FIG. 21, protecting a tension pulley against debris.

FIGS. 21, 22, and 23 illustrate views of a pair of pin guards in connection with a belt-pulley system in which the prime-mover or engine pulley drives a hydrostatic belt. More particularly, FIG. 21 shows first and second pin guards for protecting the drive pulley and a tension pulley, respectively. FIG. 22 shows the first pin guard at the drive pulley, such as the engine pulley, and FIG. 23 shows the second pin guard at the tension pulley. In addition, FIG. 23 illustrates a bracket for mounting the tension pulley. In FIG. 21, the arrows represent the direction in which the belt is driven. In each of FIGS. 22 and 23, the broken lines schematically demarcate the pin guards, or the portions of the pin guards that are effective for protecting their respective pulleys.

Figure 8:
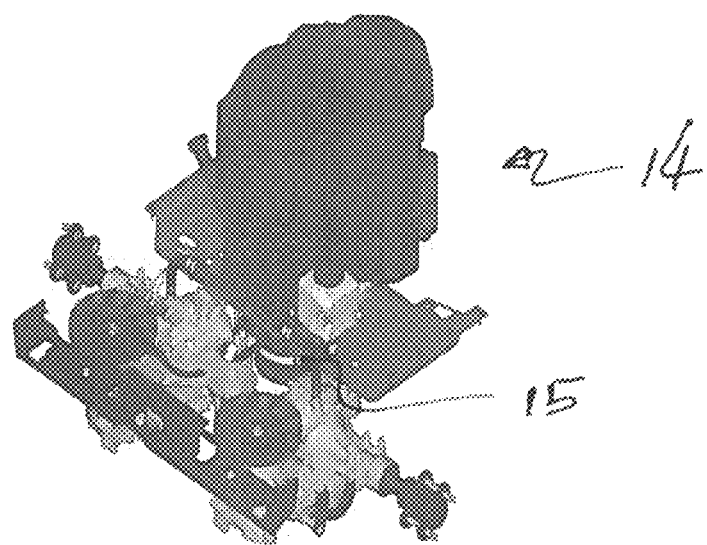
FIG. 8 is an illustration of a rear portion of working vehicle, showing a prime mover output shaft and pulley.

FIG. 8 illustrates a rear portion 14 of a working vehicle, showing a prime mover output drive shaft for driving the pulley 15 that can incorporate a pulley guard, whether a pin guard or other pulley guard, the latter being described below.

As can be understood from FIGS. 6 and 7, although a pin guard can function to block unwanted debris from reaching the associated pulley, its widthwise dimension is relatively small in relation to the widthwise distance between the two belt sections. The larger an item of debris, the better the guard can prevent it from reaching the pulley. The various embodiments of the present disclosure represent a more effective pulley guard in protecting the pulley against receiving unwanted debris, regardless of the size of items of debris.

Figure 9:
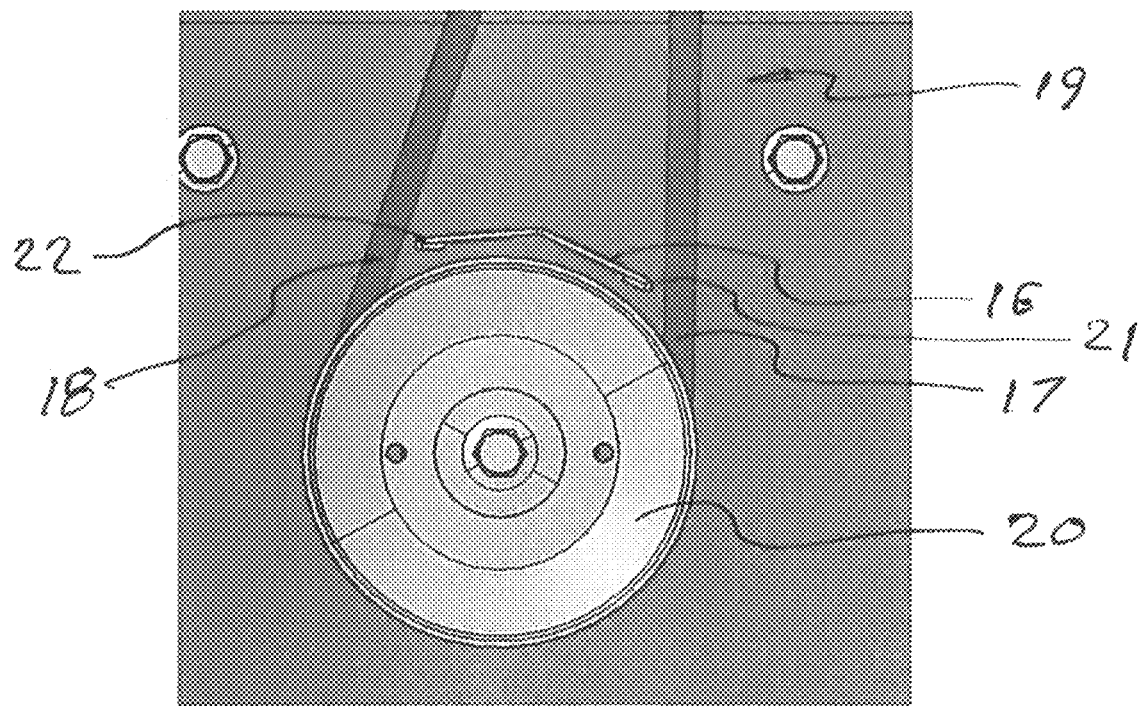
FIG. 9 illustrates in a plan view a pulley guard in the form of a plate having a V-shape positioned laterally between run-in and outgoing sections of the belt of a belt-pulley system.

FIG. 9 illustrates, in a plan view, a pulley guard 16 is positioned between a run-in belt section 17 and an out-going belt section 18 of the belt 19, as the belt serves to rotate the pulley 20 as the pulley changes the direction of the belt. In this embodiment, the pulley guard 16 has a V-shape with the two legs of the V-shape diverging toward the pulley 20.

Figure 10:
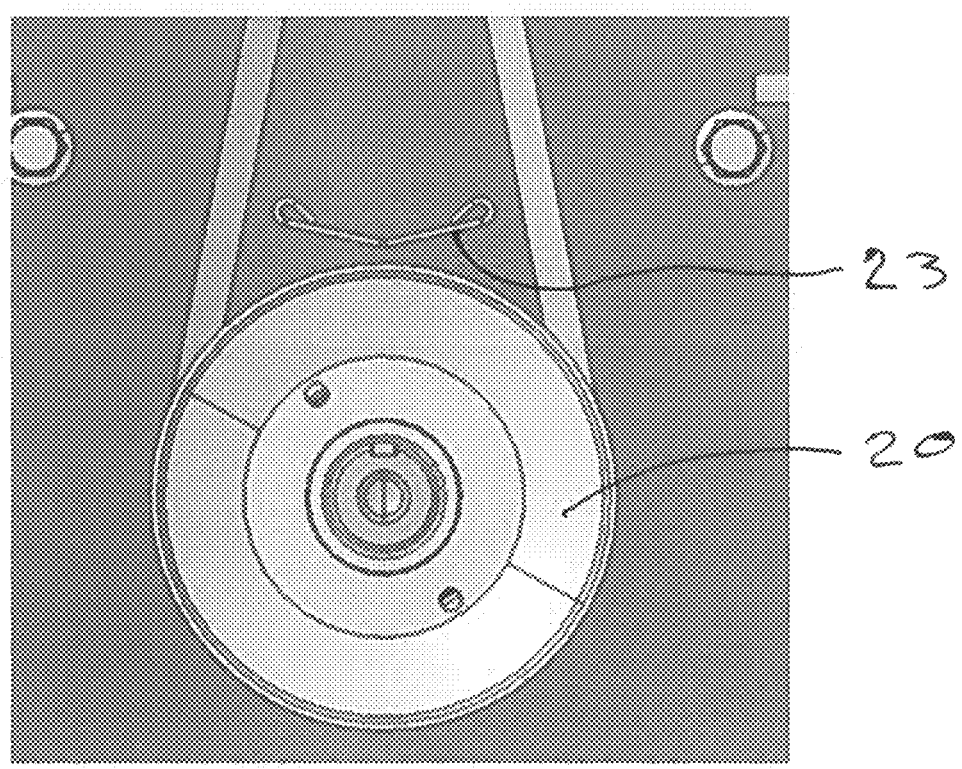
FIG. 10 illustrates an alternative to the pulley guard of FIG. 9.

FIG. 10 illustrates an alternative pulley guard 23 to FIG. 9, in which the two legs of the V-shape diverging away from the pulley 20.

As shown in the embodiments of both FIGS. 9 and 10, particularly if the pulley guard were to be made of sheet metal, at both of the side edges of the pulley guard are a curved bend 13, or hem, which provides an enlarged area facing respective ones of the two belts. By way of this feature, if either of the belts were to hit a side edge of the pulley guard, such contact would diminish the likelihood of damage to the belt or the disengagement of the belt from the pulley.

As can be understood from FIG. 1, discussed above, an unguarded pulley 1 is susceptible to incoming debris 5 across the exposed portion of its periphery between the two belt sections 3 and 4. For this reason, the width of the pulley guard of each of FIGS. 9 and 10 extends significantly, whereby the side edges 21, 22 of the pulley guard 16 come as close as possible to their respective belt sections 17, 18 without risking engagement therewith. But even with the clearances between either side edge 21, 22 and its respective belt section 17, 18, a significant widthwise distance between the belt sections are covered by the pulley guard such that the likelihood of debris entering the pulley is significantly diminished, particularly in relation to the illustrated pin-shaped guard. In fact, in contrast with the illustrated pin-shaped guard, the combined clearances on each side edge of the pulley guard of each of FIGS. 9 and 10, or those of the following examples, is less than the width of the pulley guard. An example of a range of the clearance between the belt and the pulley guard is 5-7 mm, although other ranges could be used, such as 2-7 mm or 5-10 mm or 5-20 mm or even 5-30 mm or more. However, if the clearance is too small, the pulley guard would risk contacting and damaging the belt, and if the clearance is too large, the effectiveness of the guard against preventing the ingress of debris would be lessened.

Figure 11:
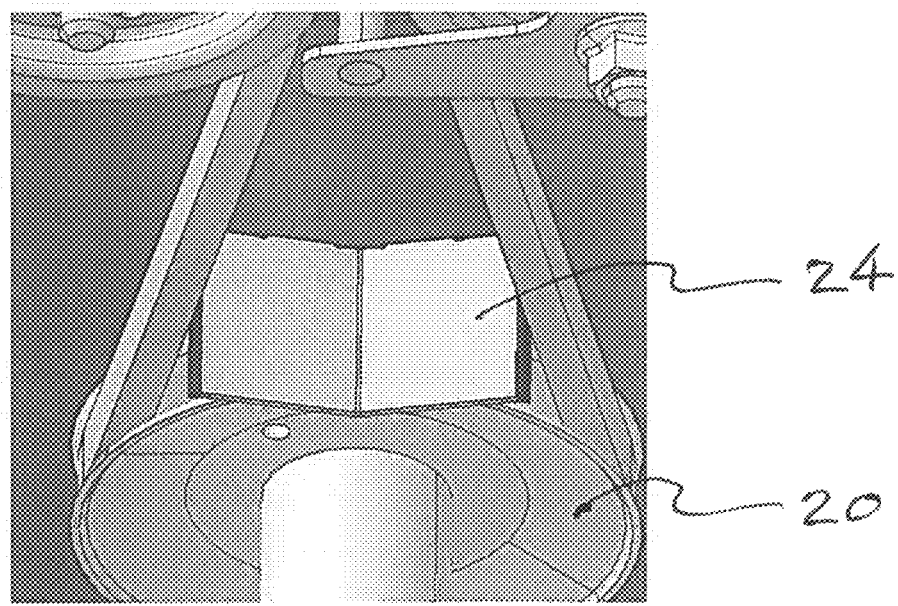
FIG. 11 illustrates, in a perspective view, an embodiment in which there is no clearance between the side edges of a pulley guard and the respective belt sections.
Figure 12:
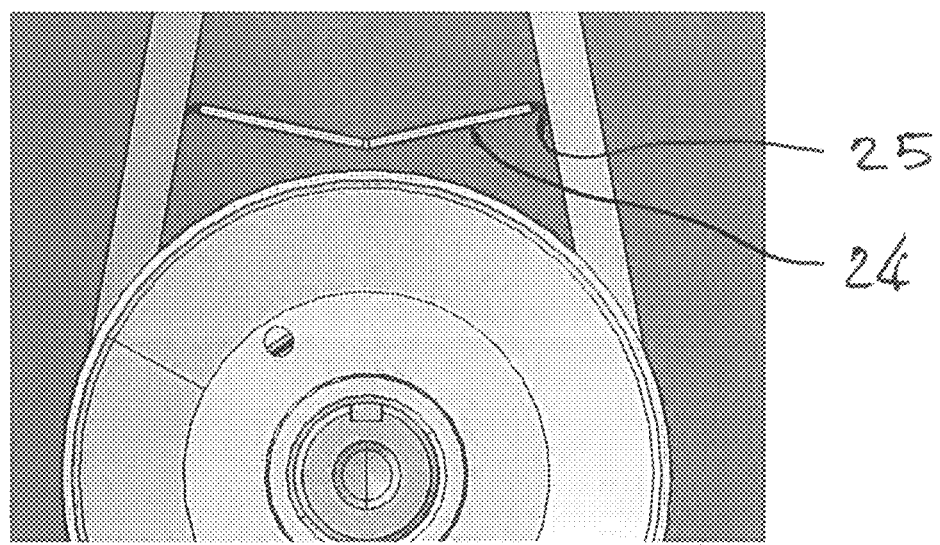
FIG. 12 illustrates, in a plan view, the embodiment of FIG. 11.
Figure 13:
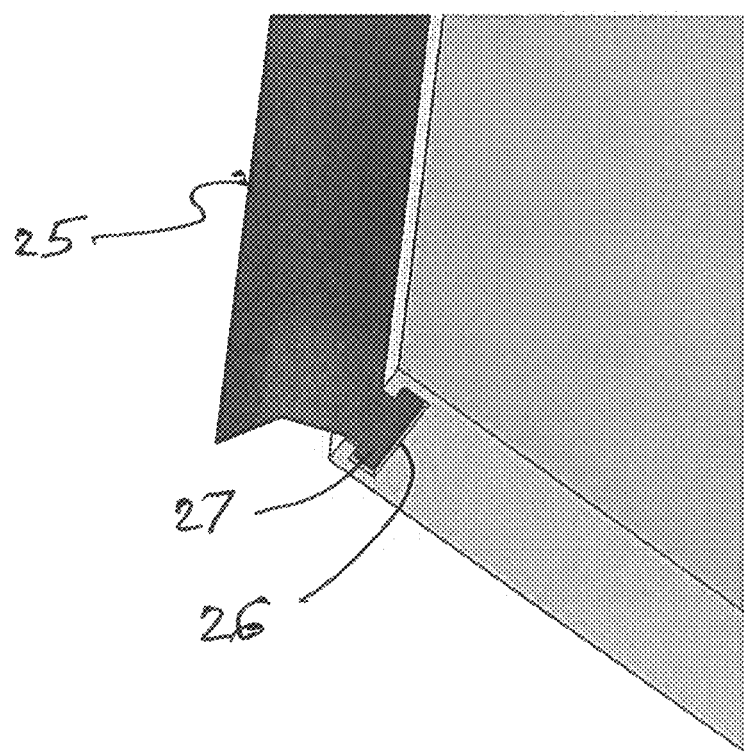
FIG. 13 shows a detail of the embodiment of FIG. 11.

In other embodiments, such as shown in FIGS. 11, 12, and 13, the pulley guard 24 can have no widthwise clearances between the pulley guard and the two belt sections. That is, the pulley guard is the total width of the belt in front of the pulley, i.e., the width of the pulley guard is equal to the distance between the two belt sections. In this embodiment, each of the side edges of the pulley guard includes a flexible side edge attachment 25 that would not damage or interfere with the operation of the belt. Examples of such flexible side edge attachments include a brush or a rubber or flexible plastic strip. FIG. 13, shows that a slot or holder 26 of the metal portion of the pulley guard to act as an anchor to hold the rubber or brush portion 27.

Figure 14:
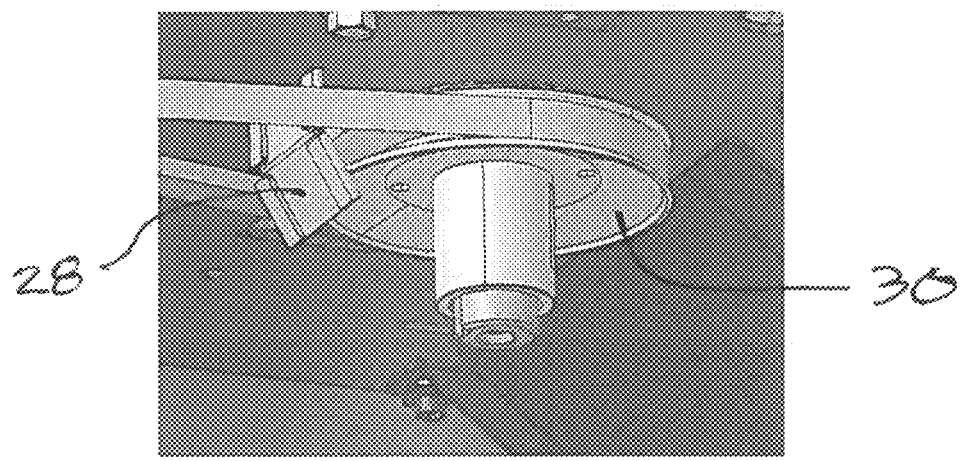
FIG. 14 illustrates, in a perspective view, an embodiment of a pulley guard that has a height that extends upwardly beyond the associated pulley, and that extends below the bottom of the pulley.
Figure 15:
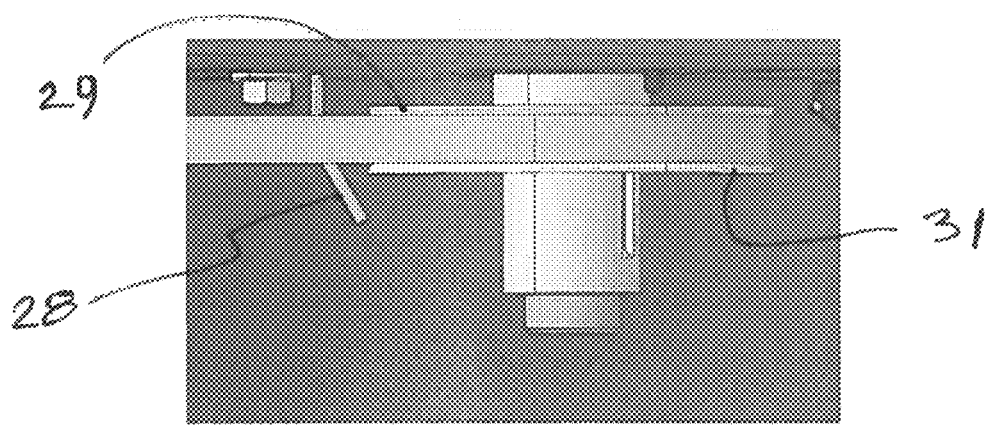
FIG. 15 is an elevation view corresponding to FIG. 14.
Figure 16:
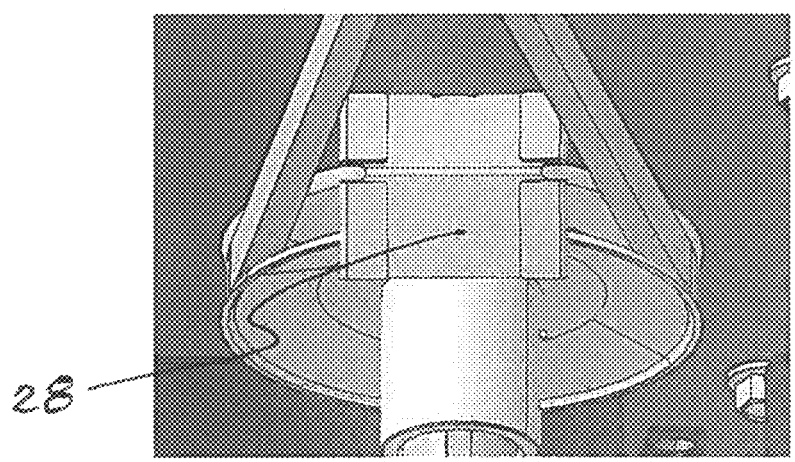
FIG. 16 is an illustration like that of FIG. 14 from another angle.

FIGS. 14, 15, and 16 illustrate different views of an embodiment in which the pulley guard 28 has a height dimension such that it extends from or higher than the top 29 of the pulley 30 to lower than the bottom of the pulley, as can be seen in FIGS. 14 and 15. As also shown in FIGS. 14 and 15, a lower portion extends under the pulley 30. An advantage of this embodiment is it provides protection for the pulley for incoming debris from a larger range of directions, such as at different angles.

Figure 17:
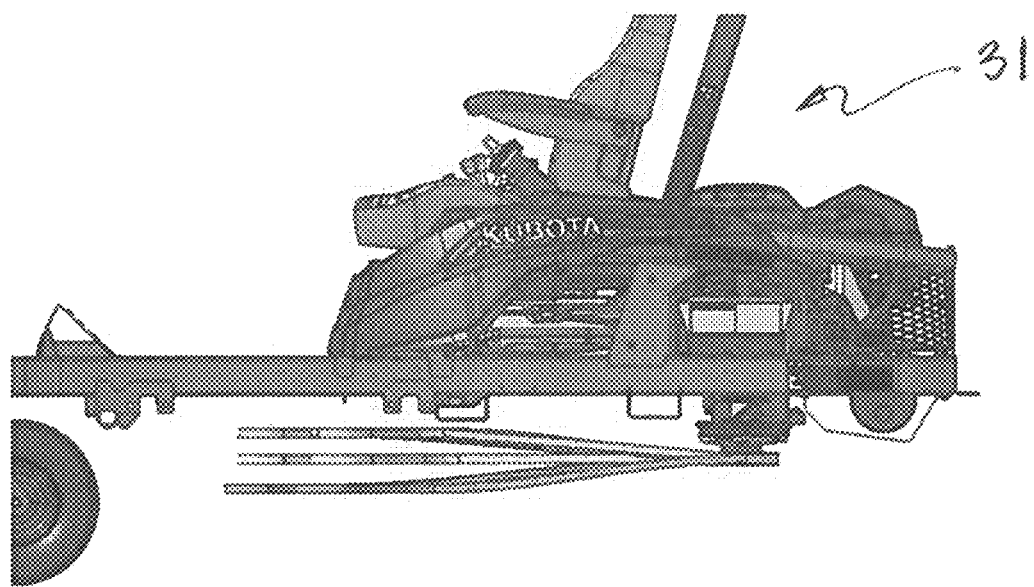
FIG. 17 is an elevation view of a rear portion of a working vehicle, showing a prime mover output shaft and pulley.

FIG. 17 illustrates an elevation view of a portion of a working vehicle 31 that includes a mower deck (not shown in FIG. 17) that is belt driven in a belt-pulley system, with the mower deck being movable in a Z direction, that is, up and down. For such a working vehicle, a pulley guard having an extended height dimension above and/or below the pulley could be advantageous.

Figure 18:
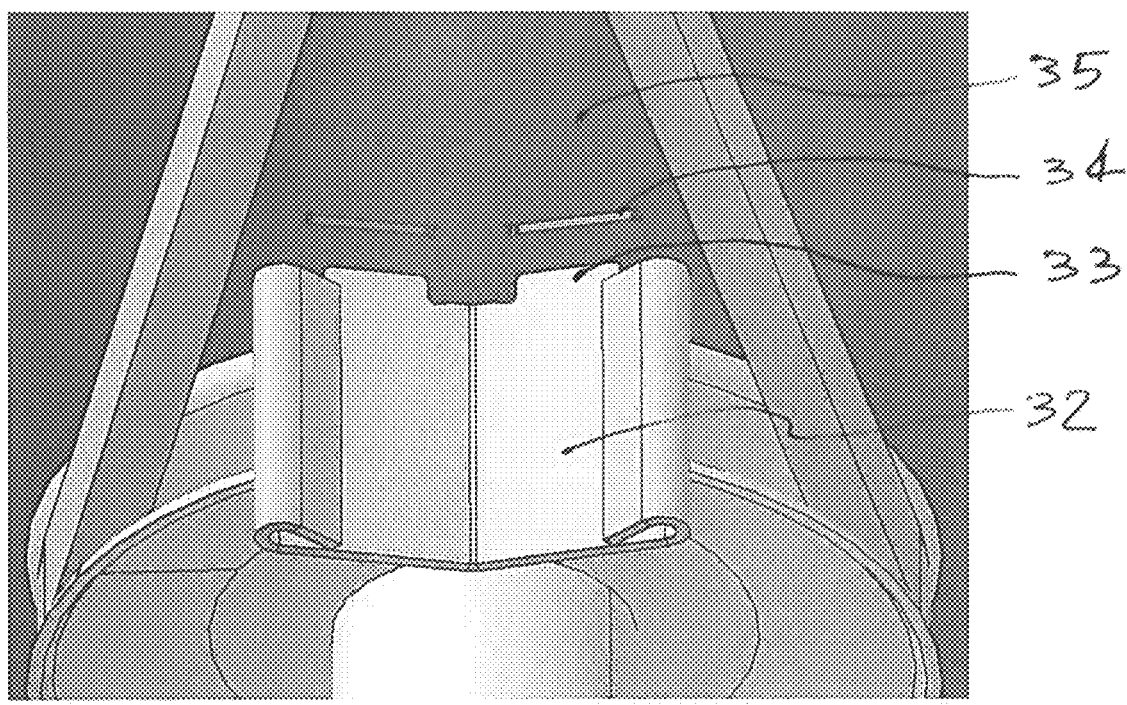
FIG. 18 shows an example of how a pulley guard could be affixed by welding in relation to the working vehicle of which it is a part.

Whatever the particular pulley guard, it can be affixed in place in relation to a vehicle of which it is a part in any of a plurality of structures, including the aforementioned cantilevered structure. Alternatively, if the pulley guard 32, such as in FIG. 18, were to be made of metal, it could welded to the same surface that the pulley rotates on. Further in this regard, to locate the pulley guard at a desired welding location, the pulley guard can have one or more tabs 33 in the pulley guard that enter into holes 34 on the mounting surface 35.

Figure 19:
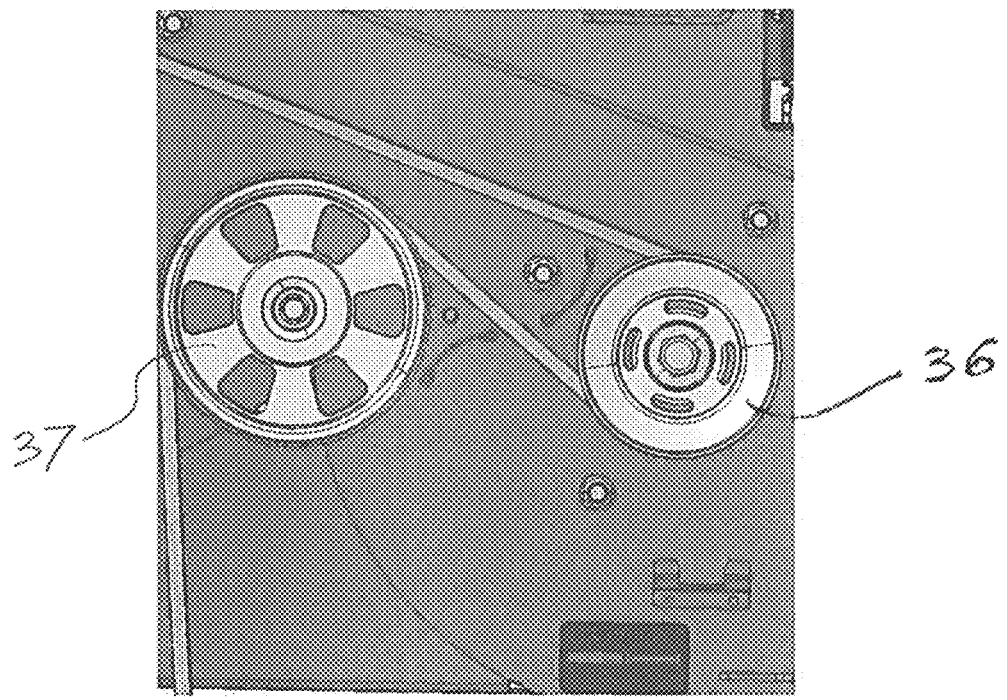
FIG. 19 is a plan view of a portion of a belt and a pair of pulleys, as well as a pair of pulley guards.
Figure 20:
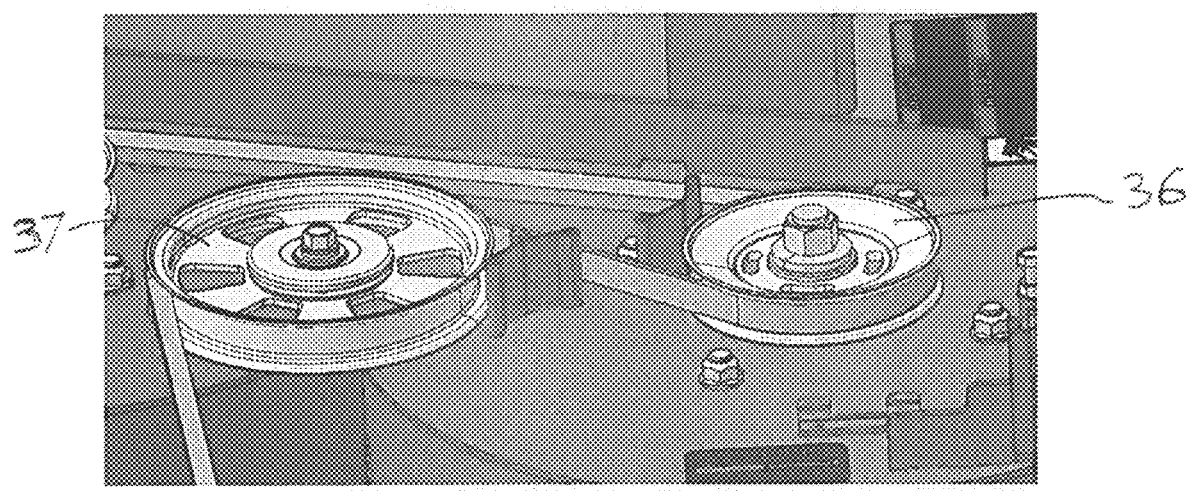
FIG. 20 is another view of that shown in FIG. 19, in perspective.

FIGS. 19 and 20 show example arrangements of how a pulley guard according to the present disclosure could be used in different applications. In this regard, for example, for a smaller pulley 36, the guard might need to be smaller, and for a larger pulley 37, the guard might need to be larger.

Among additional aspects and considerations for a pulley guard of the present disclosure include the thickness of the sheet metal or other material from which the guard is made. For example, having a thicker material allows for a stronger part for larger items of debris. Also, the size of the hems at the side edges of the pulley guard could be increased so as to allow for less likelihood of the belt breaking in the event the belt were to touch the pulley guard.

The invention claimed is:

1. A belt-pulley system configured to guard against ingress of debris to at least one or more pulleys driven by the belt, said belt-pulley system comprising:

an endless belt and a plurality of pulleys in engagement with the belt and spaced apart along the belt to define a driven path of the belt;

one of the plurality of pulleys being a prime mover output pulley;

the prime mover output pulley configured to receive a run-in section of the belt and to guide the belt to an out-going section of the belt, the run-in section and the out-going section of the belt being spaced apart by a widthwise distance;

a pulley guard configured to guard against ingress of debris to the prime mover output pulley, the pulley guard being positioned widthwise between the run-in and out-going sections of the belt, wherein the pulley guard is a pin guard located between the belt and the pulley at a position intersecting a rotational plane of the pulley, wherein the pin guard is positioned between the belt and the pulley at an input side of the belt.

2. The belt-pulley system according to claim 1, wherein: the pin guard has a diameter of approximately 11.1 mm.

3. The belt-pulley system according to claim 1, wherein: the pin guard is supported in a cantilevered arrangement.

4. The belt-pulley system according to claim 1, wherein: the pin guard has a circular cross section.

* * * * *